United States Patent
Conroy

(10) Patent No.: US 9,649,581 B2
(45) Date of Patent: May 16, 2017

(54) SCREEN SEAL

(76) Inventor: Jay Conroy, Oldsmar, FL (US)

(*) Notice: Subject to any disclaimer, the term of this patent is extended or adjusted under 35 U.S.C. 154(b) by 1297 days.

(21) Appl. No.: 12/605,366

(22) Filed: Oct. 25, 2009

(65) Prior Publication Data

US 2011/0094957 A1    Apr. 28, 2011

(51) Int. Cl.
*B01D 33/333* (2006.01)
*B01D 33/80* (2006.01)

(52) U.S. Cl.
CPC ......... *B01D 33/333* (2013.01); *B01D 33/801* (2013.01)

(58) Field of Classification Search
None
See application file for complete search history.

(56) References Cited

U.S. PATENT DOCUMENTS

| | | | |
|---|---|---|---|
| 4,582,601 A * | 4/1986 | Strow et al. | ................. 210/161 |
| 4,597,864 A | 7/1986 | Wiesemann | |
| 4,812,231 A | 3/1989 | Wiesemann | |
| 5,102,536 A | 4/1992 | Wiesemann | |
| 5,618,415 A | 4/1997 | Johnson | |
| 5,788,839 A | 8/1998 | Gargan | |
| 5,800,701 A | 9/1998 | Larsen | |
| 6,177,020 B1 | 1/2001 | Wiesemann | |
| 6,669,854 B1 | 12/2003 | Wiesemann | |
| 7,344,638 B2 | 3/2008 | Conroy | |
| 2007/0215539 A1 * | 9/2007 | Conroy | ............... B01D 33/333 |
| | | | 210/400 |
| 2011/0094957 A1 * | 4/2011 | Conroy | ......................... 210/232 |

* cited by examiner

*Primary Examiner* — Robert James Popovics
(74) *Attorney, Agent, or Firm* — Johnson & Martin, P.A.; James David Johnson

(57) ABSTRACT

A seal for preventing the bypass of solids from a filter screen assembly that can be used in water and wastewater treatment. The seal can include an L-shaped bracket and a housing that can include a channel-shaped member. A first panel of the L-shaped bracket can be inserted into a groove of a belt of the filter screen assembly so as to fill that groove. The belt can be insertably received into a channel recess of the channel-shaped member of the housing. A second panel of the L-shaped bracket can be fastened to one side wall of the channel-shaped member. By securing the L-shaped bracket to the channel-shaped member of the housing, a track is formed for slidably engaging the belt during its rotational movement. The belt's contact with the first panel of the L-shaped bracket inserted into the belt's groove forms a tight, continuous seal.

15 Claims, 9 Drawing Sheets

SCREEN SEAL

FIELD OF THE INVENTION

The invention is related to systems and methods for creating a seal. More particularly, the invention is related to systems and methods for sealing a grid assembly to prevent the bypass of solids between a moving filter and its supporting frame used for water and wastewater filtration.

BACKGROUND

Water and wastewater treatment systems use a series of filters to remove debris of various sizes from untreated wastewater entering the system. Conventionally, water and wastewater influent have been pretreated using a screen such as, for example, a mechanical bar screen or rake, to collect and remove large object debris from the influent. Other mesh-type filters have also been used to remove smaller debris from the influent during pretreatment. However, these filters fail to capture particulate matter that is about 0.1 to 6 millimeters in diameter. Small undissolved suspended and floating particulate matter such as this may also bypass the seals, if any, used in conventional pretreatment facilities.

With each filter, one or more seals may be used to retain debris within the system so that solid objects do not bypass the filter. The seals may assist in capturing large object debris and flotsam from bypassing the pretreatment filters and entering into latter stage components of the water or wastewater treatment system where other equipment could be damaged. Solids in the water and wastewater escaping the system can damage or otherwise hinder the performance and increase corrosion of the downstream equipment of the system resulting in expensive repairs, the need to maintain a stockpile of replacement parts, decreasing the life and operability of the system, and causing down-time in the form of system maintenance outages.

Rotatable pretreatment screen assemblies have been developed to more effectively remove small suspended and floating particulate debris of about 0.1 to 6 millimeters in diameter from wastewater influent. This small particulate debris such as hair, seeds, small leaves and pine needles, plastics, and textile threads can clog and damage filters and other equipment used at the primary treatment stage. Such debris is also more difficult for primary treatment systems to remove because of their focus on sedimentation rather than on the removal of flotsam. The rotatable pretreatment screens used in the removal of small particulate matter can include multiple conjoined filter screens or other parts. A need exists for a seal that can effectively close any gap between the rotating filter screen assembly and its housing.

SUMMARY

The invention relates to a seal for preventing leakage from a rotating filter screen assembly that can be used in wastewater treatment. The seal can include an L-shaped member, e.g., a bracket, and a housing that can include a channel-shaped member. A first panel of the L-shaped bracket can be inserted into a groove of a belt of the filter screen assembly so as to completely or partially fill that groove. The belt can be insertably received into a channel recess of the channel-shaped member of the housing. A second panel of the L-shaped bracket can be fastened to one side wall of the channel-shaped member. By securing the L-shaped bracket to the channel-shaped member of the housing, a track can be formed for slidably engaging the belt during its rotational movement of filter screen media. The belt's contact with the first panel of the L-shaped bracket inserted into the belt's groove forms a tight continuous and uninterrupted seal below the waterline that prevents the bypass of solids around the filter.

The seal can be used with a rotating filter grid assembly, for example, a filter grid assembly formed by multiple grid sections. In such a rotating filter grid assembly, each grid section of the filter grid assembly can be supported by corrosion-resistant links with each link being mounted vertically on grid shafts, which fit through bore holes on each end of the individual links. The grid shafts can connect the links to drive elements on each side of the filter grid sections. Each link can include a slot through which a grid section is inserted. A link washer can be placed between the links to reduce friction, and a link spacer can be placed between the links to accommodate variations in the amount of space between the links on each grid section. Each grid section can be capped on each side by a gear tooth engaging drive element. Each drive element can be placed at each end of each grid shaft to secure the drive element in place adjacent to each grid section. Each drive element can feature an exterior surface and an interior surface that includes a notch. A first end portion and a second end portion of the drive element can be located on each side of the notch. The end portions of each drive element can feature a recess. A through bore can be located at the center of each recess for insertion of the grid shaft ends. The drive element can form an elliptical loop (or a loop of any other suitable shape) that is the grid assemblies.

The grid assemblies can be engaged by a drive sprocket at each side. A drive gear can turn a drive shaft and is connected to a gear reducer that is driven by a mechanical drive. Rotation of the drive elements driven by the drive shaft causes the lugs to engage within the notch of the drive element and causes each grid assembly to turn, thereby producing the rotational movement of the filter screen assembly. At least two lugs can be in engagement with adjacent drive elements while the grid assembly is moving.

The filter grid assembly can include apertures in the grid sections that permit the entrainment of debris contained within the influent of, for example, 0.1 mm or less to 6 mm or more in diameter, e.g., pine needles, plastics, textile threads, hair, seeds, small leaves, and other small particulates.

An advantage of the screen seal is that it can prevent leakage and the bypass of solid objects around the filter grid assembly during rotational movement. Another advantage of the seal is that by reducing or eliminating the bypass of solids in the influent around the filter, the seal reduces or prevents fouling, wear, damage, and increased corrosion of the downstream equipment of the water filtration system thereby reducing maintenance time and costs.

Accordingly, the invention features a seal for sealing a filter grid assembly. The seal can include the filter grid assembly featuring first and second belts, wherein each belt has a plurality of linked belt members. Each of the plurality of linked belt members can include a groove. The groove of each linked belt member can be aligned and collinear with the grooves of the two adjacent linked belt members. The seal can also feature a housing that includes first and second frames. The first frame can be capable of being fitted into the groove of the first belt and the second frame can be capable of being fitted into the groove of the second belt.

In another aspect, the invention can feature the first and second frames being constructed from at least one material selected from among one or more of the following materials:

stainless steel, a polymer material, a corrosion-resistant metal, and a corrosion-resistant metal alloy.

In another aspect, the invention can feature the first and second belts being constructed from a material selected from among one or more of the following materials: plastic, a polymer material, natural rubber, and a synthetic elastomer material.

In another aspect, the invention can feature each belt including a plurality of opposing linked belt members that form a complete loop. At least one filter panel can be connected between each set of opposing linked belt members.

In another aspect, the invention can feature the frame having first and second channel-shaped members and first and second track members.

In another aspect, the invention can feature the first channel-shaped member being sized and shaped to receive the first belt inserted into a first channel recess of the first channel-shaped member, and the second channel-shaped member being sized and shaped to receive the second belt inserted into a second channel recess of the second channel-shaped member.

In another aspect, the invention can feature each track member including a plurality of L-shaped brackets.

In another aspect, the invention can feature each L-shaped bracket including a first panel and a second panel connected in a generally perpendicular orientation.

In another aspect, the invention can feature the first panel of each L-shaped bracket being insertable into the groove of one of the plurality of belt members.

In another aspect, the invention can feature the first panel of each L-shaped bracket being at least sufficiently long enough to fill the entire groove of one of the plurality of belt members into which the first panel is inserted.

In another aspect, the invention can feature the plurality of aligned and collinear grooves of the plurality of linked belt members of each belt including a continuous loop groove.

In another aspect, the invention can feature the first track member being slidably engaged within the loop groove of the first belt and the second track member being slidably engaged within the loop groove of the second belt.

In another aspect, the invention can feature the first and second belts moving in a synchronized rotational loop while remaining slidably engaged with the plurality of first panels of the plurality of L-shaped brackets of each respective track member with which the first belt and second belt are paired.

In another aspect, the invention can feature the seal being tight, continuous, and uninterrupted below the waterline of the filter grid assembly to prevent the bypass of solids around the filter grid assembly.

In another aspect, the invention can feature the second panel of each L-shaped bracket of the first track member being securely connected to the first channel-shaped member and the second panel of each L-shaped bracket of the second track member being securely connected to the second channel-shaped member.

In another aspect, the invention can feature the second panel member of each L-shaped bracket being connected to its respective channel-shaped member by at least one fastener.

In another aspect, the invention can feature the channels of the first and second channel-shaped members determining a track of movement of the first and second belts.

The invention also features a seal for preventing the bypass of solids from a rotating water or wastewater filtration assembly. The seal can feature a plurality of L-shaped brackets and a housing. Each of the plurality of L-shaped brackets can include first and second panels connected at a generally right angle. The housing can feature first and second opposing frames, each of which can include a channel portion. Each channel portion of each frame can include a bottom flanked by connected first and second side walls. The first panel of each L-shaped bracket can be slidably engaged with a belt of a rotating filtration assembly by insertion into a groove of the belt, and the second panel of each L-shaped bracket can be securely fastened to a first side wall of the channel-shaped portion of the opposing frame in which the belt, to which the first panel of the L-shaped bracket, is installed.

A method of the invention can be used to prevent the bypass of solids from a rotating water or wastewater filtration assembly. The method can include the step of creating a seal between first and second belts of a filter grid assembly and the filter grid assembly's housing. Each belt can feature a plurality of linked belt members, each of which includes a groove. The groove of each linked belt member can be aligned and collinear with the grooves of the two adjacent linked belt members. The housing of the method can feature first and second frames. The first frame can be capable of being fitted into the groove of the first belt and the second frame can be capable of being fitted into the groove of the second belt.

Another method of the invention includes the step of constructing the seal to be tight, continuous, and uninterrupted below the waterline of the filter grid assembly.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
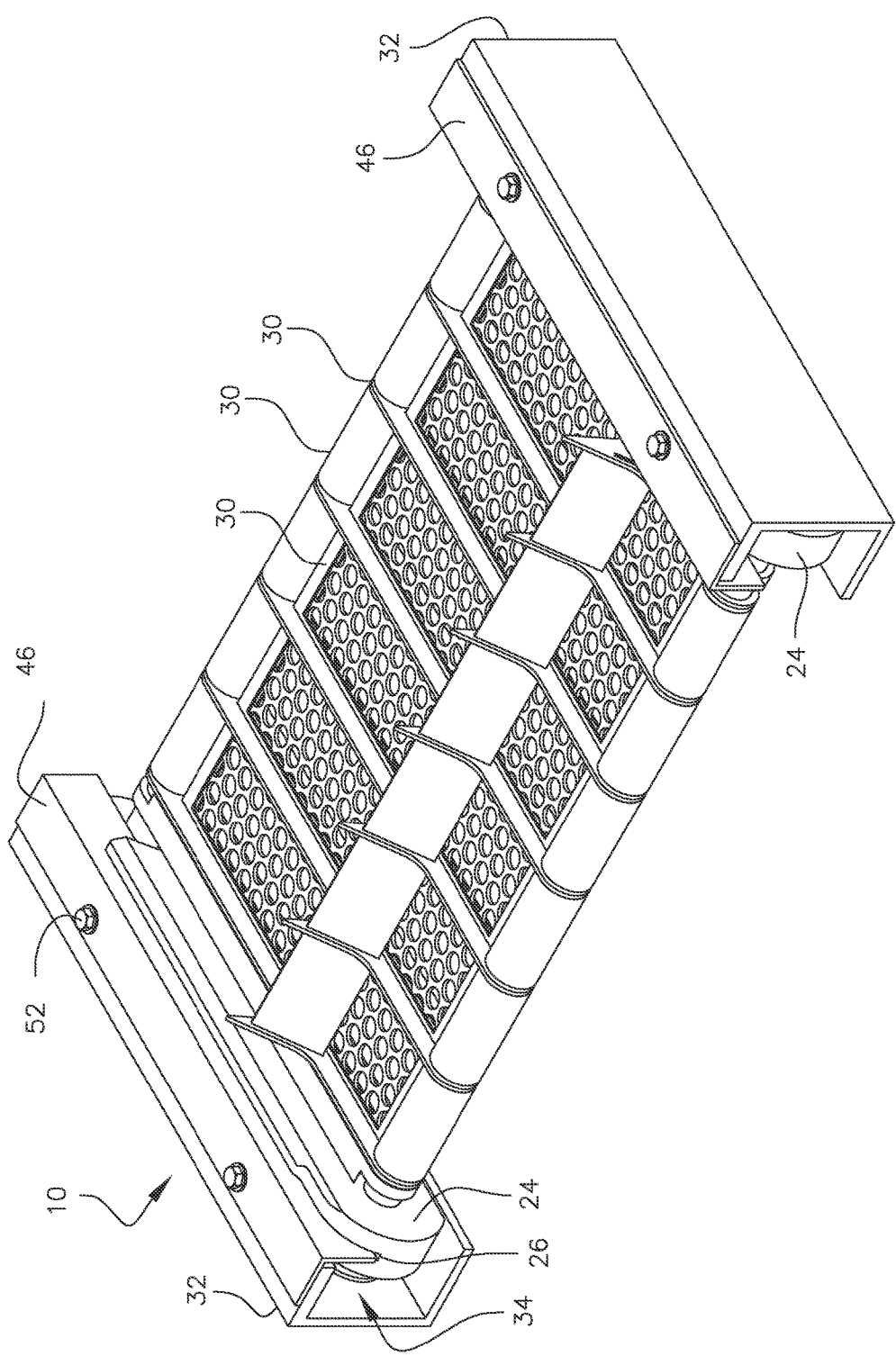
FIG. 1 is a perspective view of a grid section including a screen seal.

The invention provides a screen seal 10. The screen seal 10 can be used to create a tight, continuous and uninterrupted seal below the waterline on a rotating filtration grid assembly 12 of the type that may be used in water and wastewater filtration. The seal 10 can feature a rotating filter grid assembly 12 having first and second belts 14 and 16. The belts can be oriented in opposition to one another and can be positioned in contact with opposing first and second frames 18 and 20 of a housing 22 of the filter grid assembly. Each belt can include a plurality of linked belt members 24 connected to form a continuous loop. In exemplary embodiments, the belts 14, 16 can be circular or elliptical although any other suitable shape may be used. Each of the plurality of linked belt members 24 can feature a groove 26. The groove 26 of a belt member 24 can be aligned and collinear with the grooves of the two adjacent linked belt members connected on either side of the belt member. The continuous collinear alignment of the grooves 26 of the plurality of linked belt members 24 of a single belt 14 or 16 can form a loop groove 28. Each linked belt member 24 of the first belt 14 can include a corresponding and opposing linked belt member 24 on the second belt 16. The first belt 14 and first frame 18 within which the first belt is installed can be aligned in opposition and parallel to the second belt 16 and second frame 20 within which the second belt is installed. At least one filter panel 30 can be installed between each set of opposing linked belt members 24.

Figure 8:
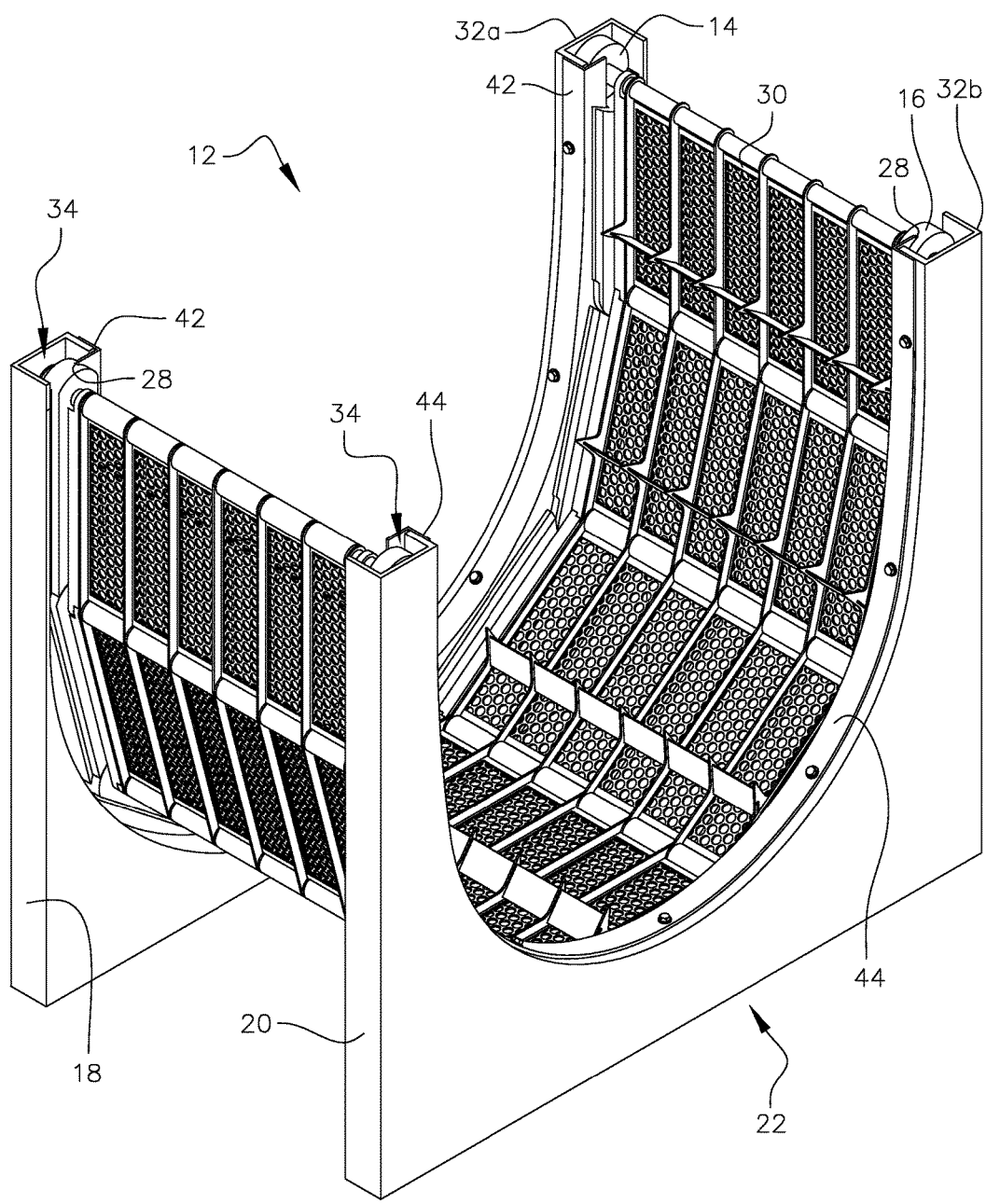
FIG. 8 is a partial perspective view of a bottom loop and housing of the grid assembly system.
Figure 9:
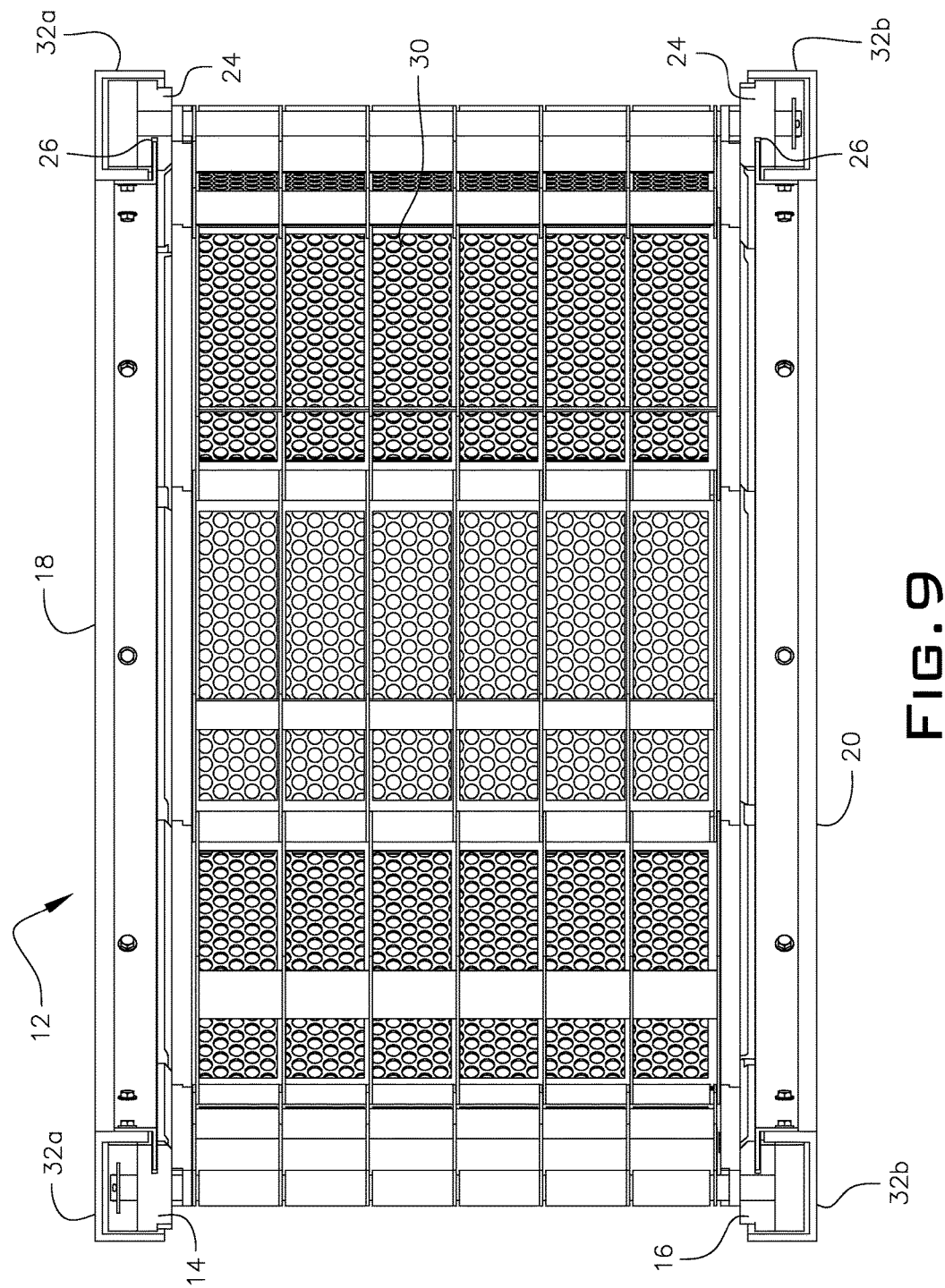
FIG. 9 is a top plan view of a bottom loop of the grid assembly system of FIG. 8.
Figure 10:
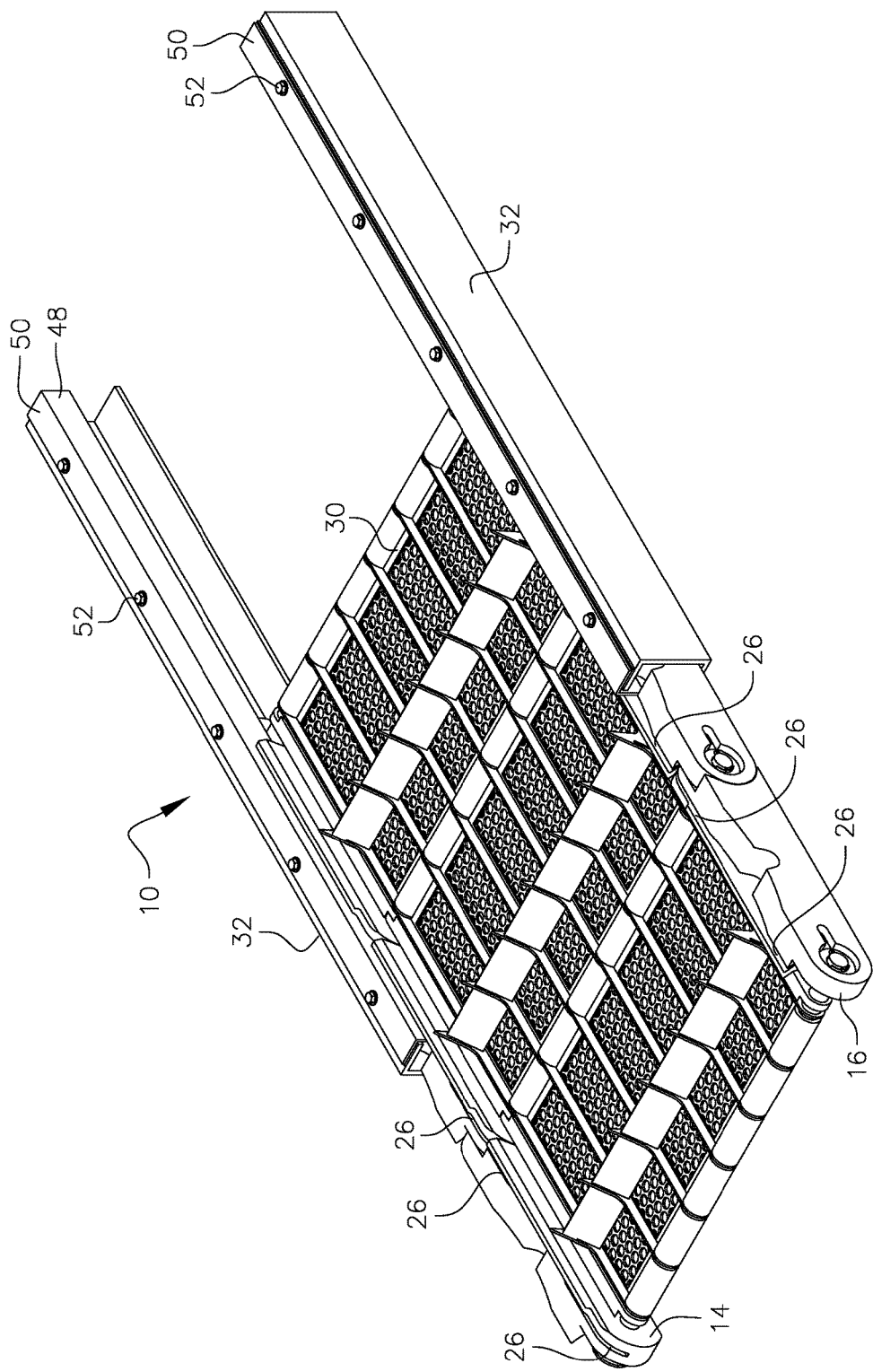
FIG. 10 is a perspective side view of several connected grid sections showing linked belt members forming a belt wherein each belt member includes a longitudinal belt member groove that is aligned and collinear with the belt member grooves of its adjoining linked belt members so as to form one continuous, longitudinal groove of the belt.

As shown in FIGS. 8 and 9, the housing 22 can include the first and second frames 18 and 20. Each of the frames may be shaped to form an elliptical channel-shaped member 32 or portion that features a channel 34. The channel 34 of each frame's channel-shaped member 32 can receive one of the belts 14 or 16 positioned within the channel in contact with a bottom 36 of the channel-shaped member 32. The channel-shaped member's bottom 36 can be flanked by two side walls 38 and 40 connected at generally right angles to the bottom. The first frame 18 can be capable of being fitted into the loop groove 28 of the first belt 14, while the second frame 20 can be capable of being fitted into the loop groove 28 of the second belt 16.

Figure 4:
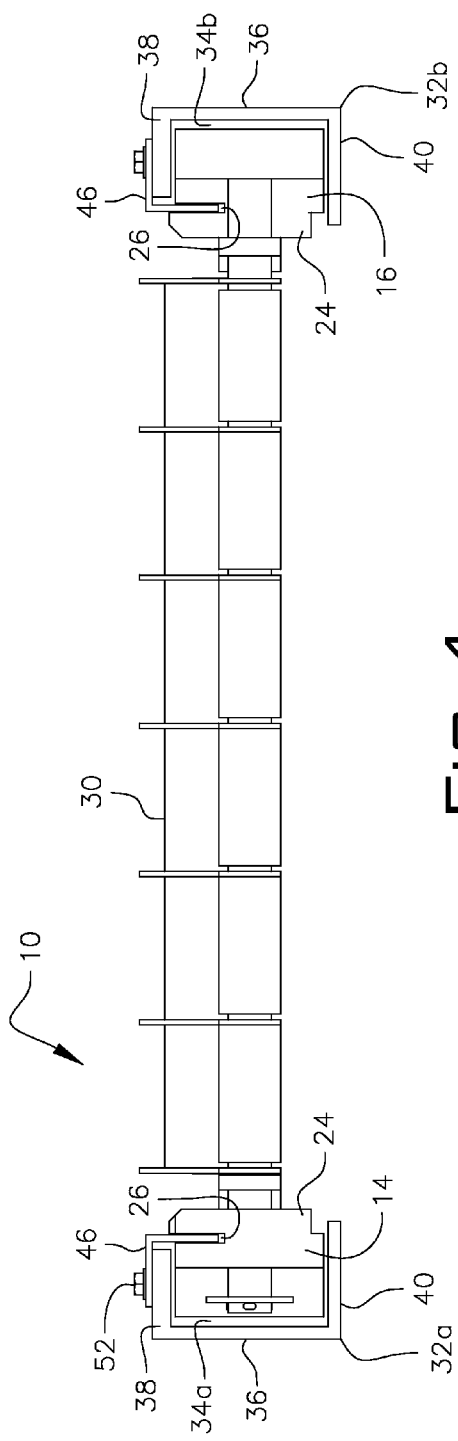
FIG. 4 is a front elevational view of the screen seal of FIG. 1.
Figure 5:
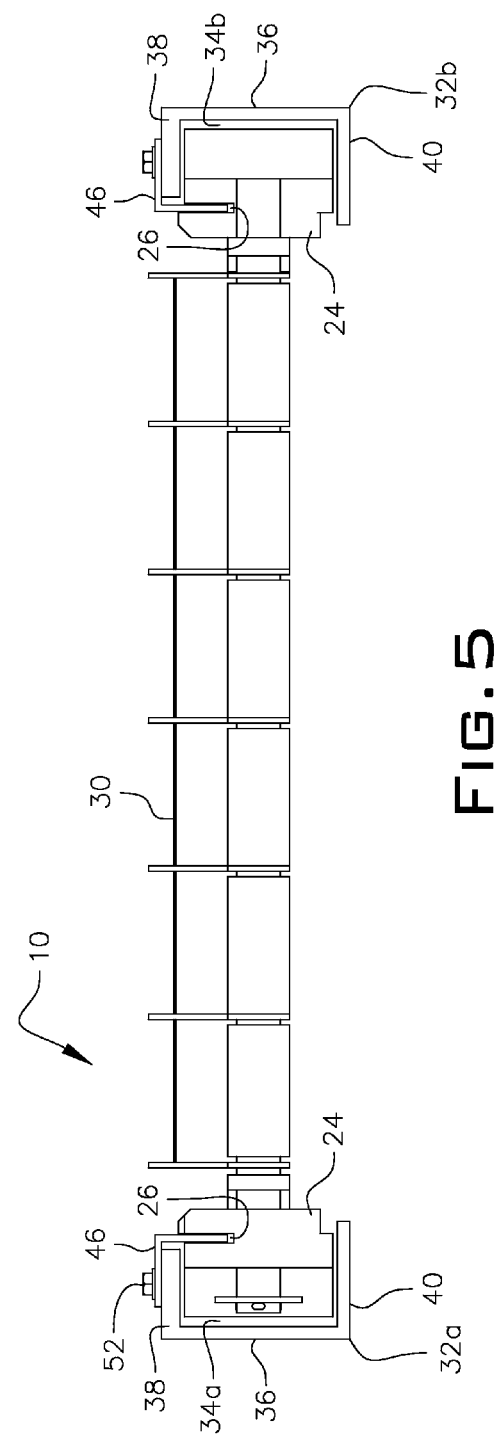
FIG. 5 is a rear elevational view of the screen seal of FIG. 1.
Figure 6:
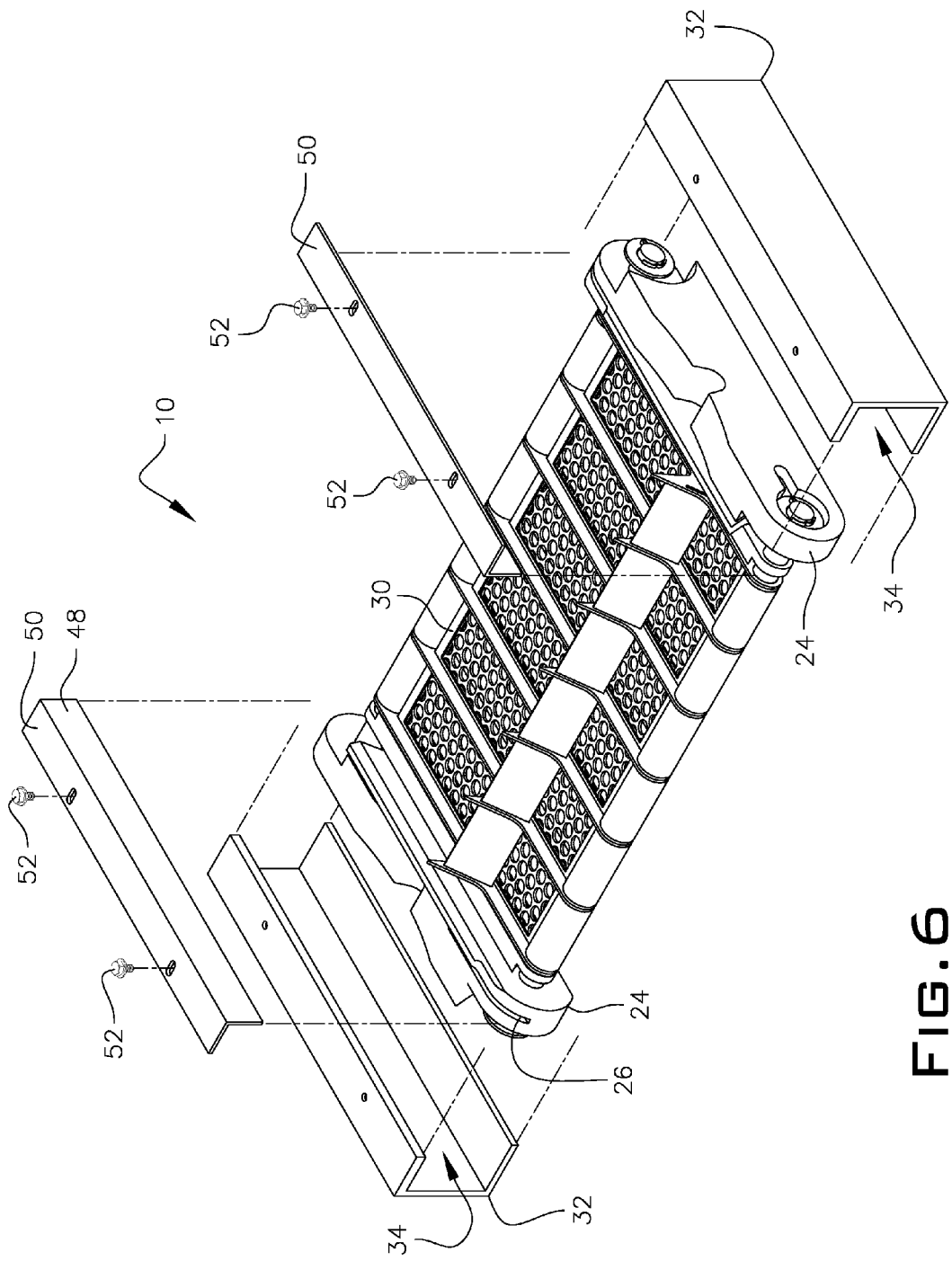
FIG. 6 is an exploded view of the grid section and screen seal of FIG. 1.
Figure 7:
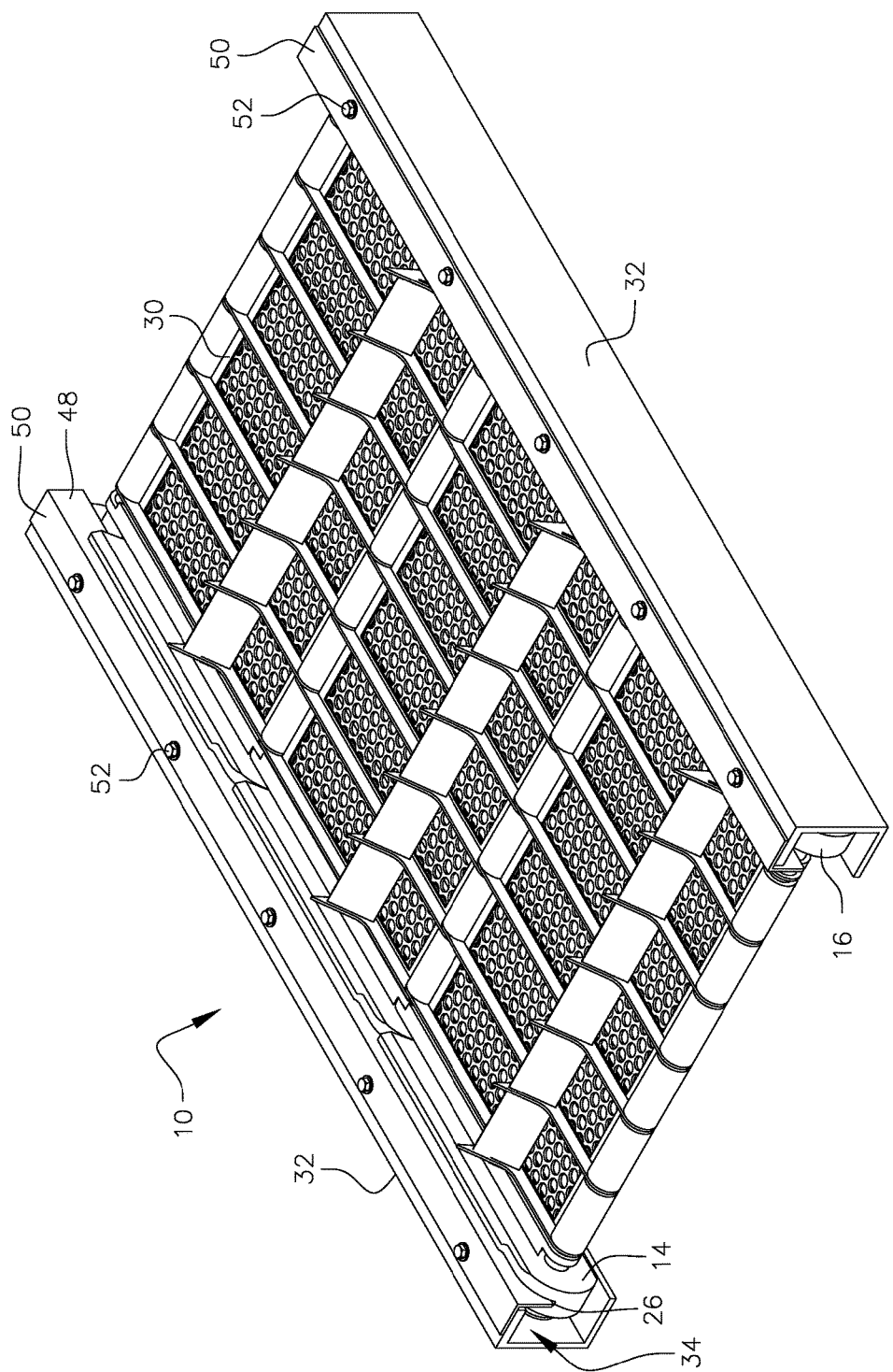
FIG. 7 is a perspective side view of several connected grid sections.

Each frame 18, 20 of the housing 22 can feature first and second channel-shaped members 32a and 32b and first and second track members 42 and 44. As shown in FIGS. 4 and 5, the first channel-shaped member 32a can be sized and shaped to receive the first belt 14 inserted into a first channel recess 34a of the first channel-shaped member 32a, and wherein the second channel-shaped member 32b is sized and shaped to receive the second belt 16 inserted into a second channel recess 34b of the second channel-shaped member 32b. Each track member 42, 44 can feature a plurality of L-shaped brackets 46. An L-shaped bracket 46 of one of the track members can include a first panel 48 and a second panel 50 connected in a generally perpendicular or right angle orientation. The first panel 48 of each L-shaped bracket 46 can be insertable into the groove 26 of one of the plurality of belt members 24.

Although L-shaped brackets 46 are used in one exemplary embodiment of the screen seal 10, the track members 42, 44 can utilize members of other shapes to insert into the grooves 26 of the belt members 24. For example, in one embodiment, the track members 42, 44 can feature one continuous and generally flat panel or a plurality of such flat panels fastened to the first and second channel-shaped members 32a and 32b and inserted into the loop groove 28. In another embodiment of the screen seal, the first and second track members can be unitary combined features of the first and second channel-shaped members, respectively. For example, each side wall 38 of each channel-shaped member could include a permanently attached panel connected in a generally perpendicular orientation to the side wall 38 and oriented so that a free end of the attached panel is proximal to the other side wall 40 of the channel-shaped member so as to be capable of insertion into the loop groove 28.

Figure 2:
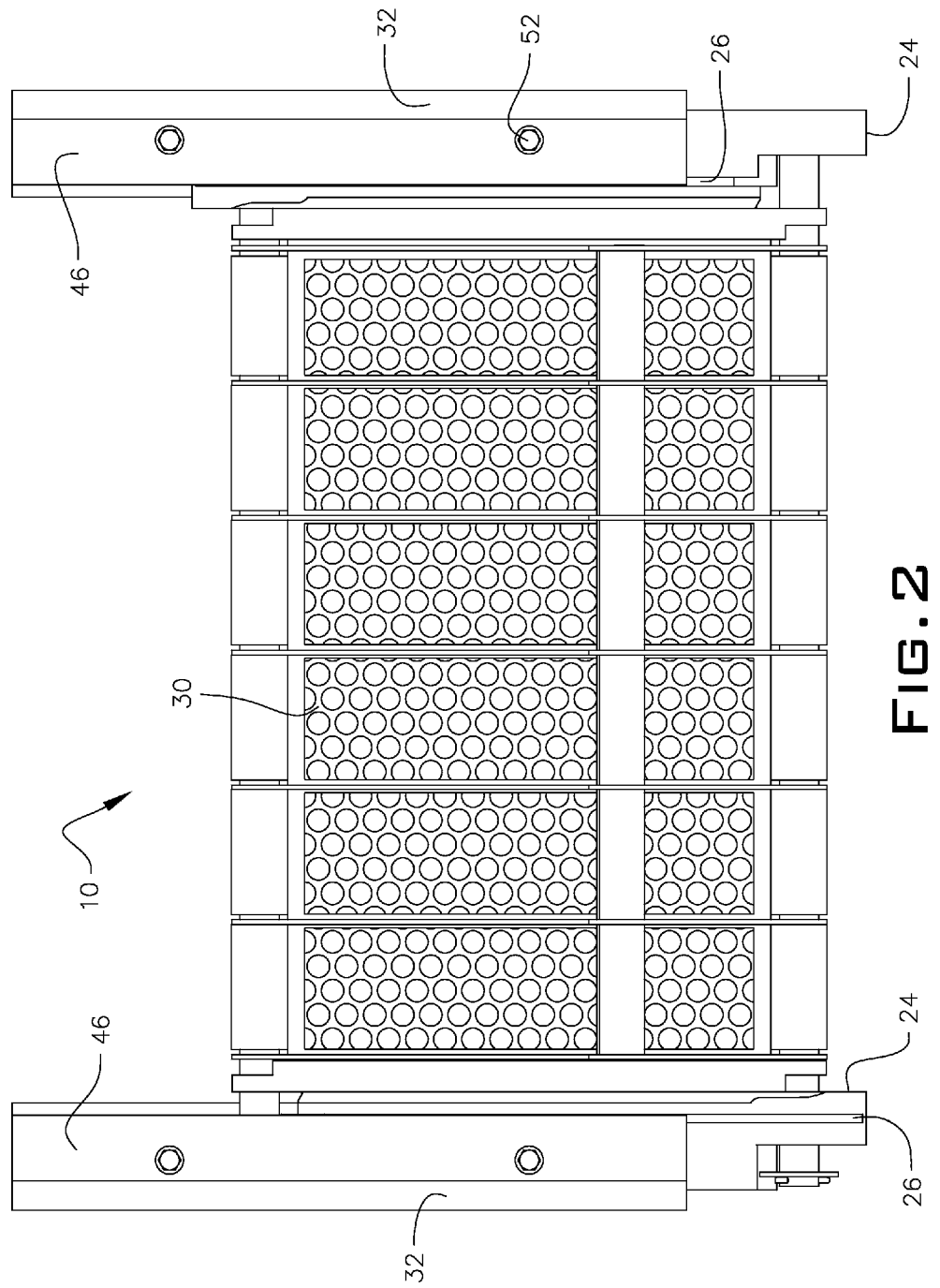
FIG. 2 is a top plan view of the screen seal of FIG. 1.
Figure 3:
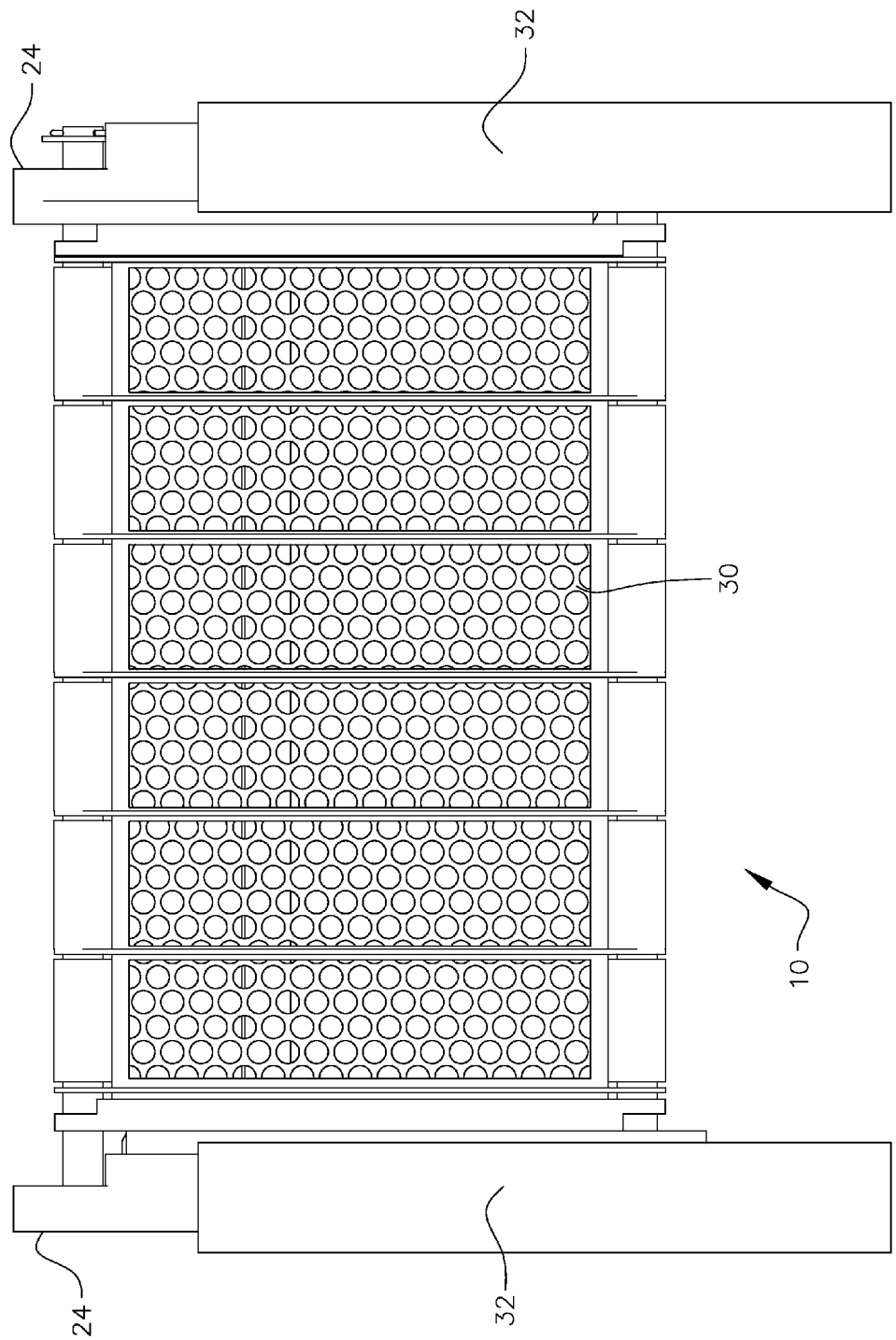
FIG. 3 is a bottom plan view of the screen seal of FIG. 1.

In an exemplary embodiment, the first panel 48 of each L-shaped bracket 46 can be at least sufficiently long enough to fill the entire groove 26 of one of the plurality of belt members 24 into which the first panel is inserted. As shown in FIGS. 2 and 3, each of the plurality of L-shaped brackets 46 can be slidably engaged within the loop groove 28. Thus, the first track member 42 is slidably engaged within the loop groove 28 of the first belt 14, and the second track member 44 is slidably engaged within the loop groove 28 of the second belt 16. The first and second belts 14 and 16 of the filter grid assembly 12 can move in a synchronized rotational loop while remaining slidably engaged with the plurality of first panels 48 of the plurality of L-shaped brackets 46 of each respective track member 42 or 44 with which the first belt and second belt are paired.

The seal formed by the interface of the plurality of first panels 48 of the L-shaped brackets 46 with the loop groove 28 formed by the plurality of aligned grooves 26 of the belt members 24 can be tight, continuous, and uninterrupted. The L-shaped brackets 46 can be adjusted so as to tighten the seal formed in loop groove 28 and to center the moving filter panels 30 as the filter grid assembly 12 rotates. Solid debris can be prevented from bypassing the filter grid assembly 12 by the seal, particularly at and below the waterline. The width of the first panel 48 of each L-shaped bracket 46 can be only slightly less than the width of the groove 26 of each belt member 24. The seal can be tight enough to prevent the bypass of solids as small as 0.05, 0.09, 0.1, 0.2, 0.5, 0.6, 0.9, 1, 1.1, 1.25, 1.5, 1.6, 1.7, 1.75, 1.9, 2, 2.5, 3, 4, 5, 6, 10, or more millimeters in diameter. Once the screen seal 10 has been assembled, the L-shaped brackets 46 can be pushed together so that each L-shaped bracket is in contact with or at least in closer proximity to the two adjacent L-shaped brackets. As the L-shaped brackets 46 are pushed together, they seal to the inside of the loop groove 28, thereby forming the tight continuous seal necessary to prevent the bypass of small solids. Depending upon the location of any particular L-shaped bracket 46 in the rotational loop of the filter grid assembly 12, the L-shaped bracket can penetrate deep into the groove 26 or it may be barely in contact with a bottom or side wall of the groove 26.

In an alternate embodiment, a lubricant may be inserted into the grooves 26 of the plurality of linked belt members 24 to reduce friction as each belt 14, 16 slides along the track created by the first panels 48 of the L-shaped brackets 46 of the first and second belts 14 and 16.

As shown in FIGS. 1, 2, 6, and 7, the second panel 50 of each L-shaped brackets 46 of the first track member 42 can be securely connected to the first channel-shaped member 32a and whereas the second panel 50 of each L-shaped bracket 46 of the second track member 44 can be securely connected to the second channel-shaped member 32b. The second panel member 50 of each L-shaped bracket 46 can be connected to its respective channel-shaped member 32a or 32b by at least one fastener 52. Fasteners 52 that may be used to connect the L-shaped brackets to their respective channel-shaped members include screws, cotter pins, bolts, washers, and any other suitable fastening means. The fasteners 52 can be loosened and tightened to permit adjustment of the orientation of each L-shaped bracket 46 with the loop groove 28.

By their shape, the channels 34 of the first and second channel-shaped members 32a and 32b can determine a track of movement of the first and second belts 14 and 16 as the filter grid assembly 12 rotates.

In an exemplary embodiment, the housing and its first and second frames can be constructed from stainless steel. In other embodiments, the housing and its frames can be constructed from carbon steel, aluminum, a composite material, a polymer material, a corrosion-resistant metal, or a corrosion-resistant metal alloy. In an exemplary embodiment, the first and second belts can be constructed from plastic. In other embodiments, the first and second belts can be constructed from a polymer material, natural rubber, or a synthetic elastomer material.

The invention also includes a method for preventing the bypass of solids from a rotating water or wastewater filtration assembly. The method can include the step of creating a seal such as, for example, a seal of the type described above, between first and second belts of a filter grid assembly and the filter grid assembly's housing. Each belt can include a plurality of linked belt members, and each of the plurality of linked belt members can feature a groove. The groove of each linked belt member can be aligned and collinear with the grooves of the two adjacent linked belt members so that all of the grooves of a set of linked belt members form a loop groove that is continuous around the entire belt. The housing of filter grid assembly of the method can include first and second frames. The first frame can be capable of being fitted into the groove of the first belt, and the second frame can be capable of being fitted into the groove of the second belt.

In another step of the method, lubricant can be inserted into the grooves of the plurality of linked belt members. The addition of lubricant may assist in reducing friction as the belts rotate the filter grid assembly along a track provided by channel-shaped members and a plurality of L-shaped brackets of the first and second frames.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A rotating water or wastewater filter grid assembly sealed by a screen seal to prevent the bypass of solids from the filter grid assembly, the filter grid assembly comprising:
a screen seal comprising first and second belts, each belt comprising a groove;
a plurality of L-shaped brackets attachable via a fastener that can be loosened and tightened to permit adjustment of the position of each of the plurality of the L-shaped brackets, each comprising first and second panels connected at a generally right angle;
a housing comprising first and second opposing frames, the first opposing frame comprises a first channel-shaped member and the second opposing frame comprises a second channel-shaped member, each channel-shaped member comprising a bottom flanked by connected first and second side walls,
wherein the first panel of each L-shaped bracket is slidably engaged with the belt of the screen seal to which it is adjacent by insertion into the groove of the belt, and
wherein the second panel of each L-shaped bracket is securely fastened to a first side wall of the channel-shaped member of the opposing frame in which the belt is installed.

2. The filter grid assembly of claim 1, wherein each opposing frame further comprises first and second track members.

3. The filter grid assembly of claim 2, wherein the first channel-shaped member is sized and shaped to receive the first belt inserted into a first channel recess of the first channel-shaped member, and wherein the second channel-shaped member is sized and shaped to receive the second belt inserted into a second channel recess of the second channel-shaped member.

4. The filter grid assembly of claim 2, wherein each track member comprises some of the plurality of L-shaped brackets attachable via a fastener that can be loosened and tightened to permit adjustment of the position of each of the plurality of L-shaped brackets.

5. The screen seal of claim 2, wherein the first belt and the second belt each comprise a plurality of belt members, wherein each belt member comprises a belt member groove that is aligned and collinear with belt member grooves of its adjacent belt members, wherein the aligned and collinear belt member grooves of the plurality of belt members of the first belt form the groove of the first belt, and wherein the aligned and collinear belt member grooves of the plurality of belt members of the second belt form the groove of the second belt.

6. The filter grid assembly of claim 5, wherein the first panel of each L-shaped bracket is at least sufficiently long enough to fill the entire belt member groove of the belt member into which the first panel is inserted.

7. The filter grid assembly of claim 5, wherein the groove of each of the first and second belts forms a loop that is continuous around the length of the belt.

8. The filter grid assembly of claim 7, wherein the first track member is slidably engaged within the groove of the first belt and the second track member is slidably engaged within the groove of the second belt.

9. The filter grid assembly of claim 5, wherein the first and second belts move in a synchronized rotational loop while remaining slidably engaged with the plurality of first panels of the plurality of L-shaped brackets of each respective track member with which the first belt and second belt are paired.

10. The filter grid assembly of claim 5, wherein the second panel of each L-shaped bracket of the first track member is securely connected to the first channel-shaped member and wherein the second panel of each L-shaped bracket of the second track member is securely connected to the second channel-shaped member.

11. The filter grid assembly of claim 10, wherein the second panel member of each L-shaped bracket is connected to its respective channel-shaped member by at least one fastener.

12. The filter grid assembly of claim 2, wherein the channels of the first and second channel-shaped members determine a track of movement of the first and second belts.

13. The filter grid assembly of claim 1, wherein the insertion of the first panel of each L-shaped bracket into the groove of the belt and the slidable engagement between the L-shaped bracket and the belt within the groove continuously seals a space adjacent to the screen seal and the filter grid assembly below a waterline provided by the filter grid assembly to prevent solids from bypassing the filter grid assembly.

14. A screen seal installed in a filter grid assembly having first and second opposing channel-shaped members, the screen seal comprising:
   a first plurality of linked belt members, each belt member comprising a longitudinal groove therein that is aligned and collinear with grooves of adjacent linked belt members;
   a second plurality of linked belt members, each belt member comprising a longitudinal groove therein that is aligned and collinear with grooves of adjacent linked belt members, wherein the second plurality of linked belt members is located opposite to the first plurality of linked belt members;
   a filter panel installed between each set of opposing linked belt members of the first and second pluralities of linked belt members; and
   a plurality of L-shaped brackets, each comprising a first panel and a second panel connected at a generally right angle;
   wherein the first plurality of linked belt members is movably received in the first channel-shaped member of the filter grid assembly and the second plurality of linked belt members is movably received in the opposing second channel-shaped member of the filter grid assembly; and
   wherein each plurality of linked belt members slidably receives the first panel of one or more of the plurality of L-shaped brackets while the second panel of each of the plurality of L-shaped brackets is fastened to its respective channel-shaped member.

15. The screen seal of claim 14, wherein the first plurality of linked belt members comprise a first belt and the aligned and collinear grooves of the first plurality of linked belt members define a groove of the first belt, and wherein the second plurality of linked belt members comprise a second belt and the aligned and collinear grooves of the second plurality of linked belt members define a groove of the second belt.

* * * * *